(12) United States Patent
Bruex et al.

(10) Patent No.: US 9,718,450 B2
(45) Date of Patent: Aug. 1, 2017

(54) CONTROL DEVICE FOR A BRAKE SYSTEM OF A VEHICLE, AND METHOD FOR OPERATING A BRAKE SYSTEM OF A VEHICLE

(71) Applicant: Robert Bosch GmbH, Stuttgart (DE)

(72) Inventors: Thomas Bruex, Oberstenfeld (DE); Benno Schmieg, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 14/019,172

(22) Filed: Sep. 5, 2013

(65) Prior Publication Data

US 2014/0084675 A1    Mar. 27, 2014

(30) Foreign Application Priority Data

Sep. 21, 2012 (DE) .................. 10 2012 216 993

(51) Int. Cl.
| | | |
|---|---|---|
| *B60T 15/00* | (2006.01) | |
| *B60T 13/14* | (2006.01) | |
| *B60T 7/04* | (2006.01) | |
| *B60T 13/16* | (2006.01) | |
| *B60T 13/66* | (2006.01) | |

(Continued)

(52) U.S. Cl.
CPC .............. *B60T 15/00* (2013.01); *B60T 7/042* (2013.01); *B60T 8/4072* (2013.01); *B60T 13/142* (2013.01); *B60T 13/166* (2013.01); *B60T 13/662* (2013.01); *B60T 13/686* (2013.01)

(58) Field of Classification Search
CPC ........ B60T 15/00; B60T 13/142; B60T 7/042; B60T 13/166; B60T 13/662; B60T 13/686

USPC ........ 303/20, 122.09, 122.1, 122.12, 122.13, 303/122.14, 186, 9.62, 9.63

See application file for complete search history.

(56) References Cited

U.S. PATENT DOCUMENTS 5,342,120 A *  8/1994  Zimmer .................... B60T 8/32
                                                    303/113.2
6,450,591 B1*  9/2002  Kawahata ............. B60T 8/3655
                                                    303/122.05

(Continued)

FOREIGN PATENT DOCUMENTS

DE    10 2009 001401       9/2010
JP         03038453 A  *   2/1991

*Primary Examiner* — Thomas J Williams
*Assistant Examiner* — Mariano Sy
(74) *Attorney, Agent, or Firm* — Norton Rose Fulbright US LLP; Gerard Messina

(57) ABSTRACT

A control device for a vehicle brake system, having a control device/arrangement by which a closing signal is outputtable to an isolation valve via which a first brake circuit is hydraulically connected to a main brake cylinder, and at least one first control signal is outputtable to at least one first hydraulic component, so that a first actual brake pressure in the first brake circuit can be varied, an existing functional impairment of the at least one first hydraulic component and/or of at least one further brake system component being determinable, or a warning signal being receivable, and, if warranted, a closing signal being outputtable to a changeover valve of a second brake circuit, and, after or simultaneously with an outputting of the closing signal to the changeover valve, an opening signal being outputtable to the isolation valve. Also described is a related method for operating the vehicle brake system.

20 Claims, 3 Drawing Sheets

(51) Int. Cl.
B60T 13/68 (2006.01)
B60T 8/40 (2006.01)

(56) References Cited

U.S. PATENT DOCUMENTS

| | | | | |
|---|---|---|---|---|
| 8,186,770 | B2* | 5/2012 | Klug | B60T 8/4059 |
| | | | | 303/11 |
| 8,414,089 | B2* | 4/2013 | Feigel | B60T 8/4881 |
| | | | | 303/113.1 |
| 8,857,922 | B2* | 10/2014 | Dinkel | B60T 13/141 |
| | | | | 303/10 |
| 8,955,922 | B2* | 2/2015 | Kunz | B60T 8/267 |
| | | | | 303/114.3 |
| 2006/0066146 | A1* | 3/2006 | Otomo | B60T 8/26 |
| | | | | 303/151 |
| 2010/0276240 | A1* | 11/2010 | Wuerth | B60L 7/003 |
| | | | | 188/358 |
| 2014/0167493 | A1* | 6/2014 | Kuhlman | B60T 13/142 |
| | | | | 303/3 |

* cited by examiner

CONTROL DEVICE FOR A BRAKE SYSTEM OF A VEHICLE, AND METHOD FOR OPERATING A BRAKE SYSTEM OF A VEHICLE

RELATED APPLICATION INFORMATION

The present application claims priority to and the benefit of German patent application no. 10 2012 216 993.8, which was filed in Germany on Sep. 21, 2012, the disclosure of which is incorporated herein by reference.

FIELD OF THE INVENTION

The present invention relates to a control device for a brake system of a vehicle. The present invention also relates to a brake system for a vehicle. In addition, the present invention relates to a method for operating a brake system of a vehicle.

BACKGROUND INFORMATION

German patent document DE 10 2009 001 401 A1 discusses a brake system, a method for operating a brake system, and a production method for a brake system. The brake system has a first brake circuit that is connected to a main brake cylinder via an isolation valve. By closing the isolation valve, the wheel brake cylinder of the first brake circuit can be decoupled from the main brake cylinder. Thus, using a pump and/or using a continuously adjustable valve of the first brake circuit, a brake pressure present therein can be varied independently from an internal pressure in the main brake cylinder.

SUMMARY OF THE INVENTION

The present invention creates a control device for a brake system of a vehicle having the features described herein, a brake system for a vehicle having the features described herein, and a method for operating a brake system of a vehicle having the features described herein.

Through the closing according to the present invention of the changeover valve of the second brake circuit, it can be prevented that the simultaneous or subsequent opening of the isolation valve of the first brake circuit causes a collapse of the second actual brake pressure present in the second brake circuit. Through the opening according to the present invention of the isolation valve of the first brake circuit given a closed changeover valve of the second brake circuit, it can be ensured that no brake fluid escapes from the second brake circuit via the open changeover valve and open isolation valve. In this way, it can be ensured that there is no temporary reduction of a braking performance of the at least one wheel brake cylinder of the second brake circuit due to the opening of the isolation valve. The present invention thus still enables a relatively fast braking of the vehicle despite the existing functional impairment of the at least one first hydraulic component and/or of the at least one other brake system component.

The changeover valve of the second brake circuit may be understood as a valve having a check valve (situated parallel). Thus, the changeover valve, even in its closed state, can still be bypassed by the driver. This can be understood as meaning that even when the changeover valve is in its closed state, brake fluid is still capable of being transferred from the main brake cylinder into the second brake circuit via the check valve. In this way, despite the changeover valve being in its closed state, the driver can still brake directly into the second brake circuit. The closing of the changeover valve of the second brake circuit thus does not impair the buildup/increase of the second actual brake pressure present therein via an actuation of a brake actuating element connected to the main brake cylinder.

In an advantageous specific embodiment, the control device is configured so that, after the outputting of the closing signal to the changeover valve and the outputting of the opening signal to the isolation valve, it controls at least one second hydraulic component of the brake system, using at least one second control signal, in such a way that a second actual brake pressure present in the second brake circuit can be increased by the at least one second hydraulic component controlled by the at least one second control signal. In this way, an additional active pressure buildup can be carried out in the second brake circuit, through which a faster braking of the vehicle is possible. In particular, the second actual brake pressure present in the second brake circuit can, despite the closing of the changeover valve, be increased as a function of (pedal) actuation, and/or as a function of slippage.

In a likewise advantageous specific embodiment, the control device is configured so that, after the outputting of the closing signal to the changeover valve and the outputting of the opening signal to the isolation valve, it compares a provided actual pressure quantity referring to an admission pressure to a specified threshold value quantity, and, as soon as the actual pressure quantity is greater than the threshold value quantity, it outputs an opening signal to the changeover valve, by which the changeover valve can be controlled into its open state. In particular, the threshold value quantity can be specified in such a way that the changeover valve is not reopened until a pressure collapse has been excluded.

Likewise, in a further advantageous specific embodiment, the control device can be configured so that, after the outputting of the closing signal to the changeover valve and the outputting of the opening signal to the isolation valve, it compares a newly provided specification quantity to a specified comparison specification quantity, and, as soon as the specification quantity is equal to the comparison specification quantity, it outputs the opening signal to the changeover valve, by which the changeover valve can be controlled into its open state. For example, the comparison specification quantity can be specified in such a way that the changeover valve is opened as soon as the driver interrupts/terminates an actuation of the brake actuating element (e.g. a brake pedal) connected to the main brake cylinder.

In a further advantageous specific embodiment, the control device is configured to output the opening signal, by which the changeover valve can be controlled into its open state, to the changeover valve after the expiration of a fixedly specified time interval beginning with or after the outputting of the closing signal. In this case as well, a premature opening of the changeover valve is reliably prevented.

The advantages described in the preceding paragraphs are also ensured in the case of a brake system for vehicle having such a control device.

The advantages described above can also be realized through an execution of a corresponding method for operating a brake system of a vehicle. Reference is made to the fact that the method can be developed corresponding to the features described above.

Further features and advantages of the present invention are explained in the following on the basis of the Figures.

DETAILED DESCRIPTION

Figure 1:
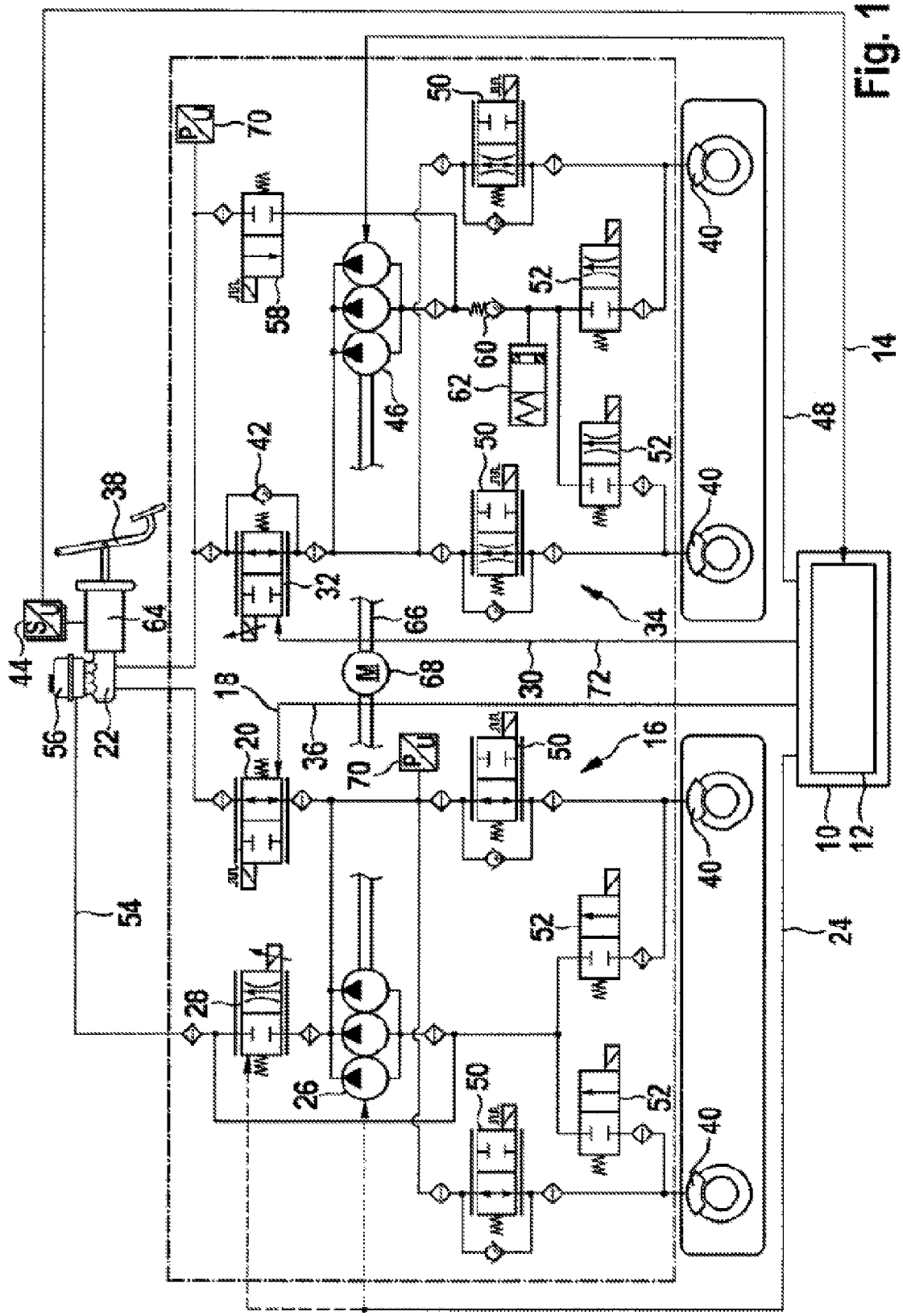
FIG. 1 shows a schematic representation of a specific embodiment of the control device and of a vehicle brake system that cooperates therewith.

FIG. 1 shows a schematic representation of a specific embodiment of the control device and of a vehicle brake system that cooperates therewith.

Control device 10 shown schematically in FIG. 1 includes a control device/arrangement 12 by which, taking into account a provided specification quantity 14 regarding at least one target brake pressure that is to be set in a first brake circuit 16 of the brake system, a closing signal 18 can be outputted to an isolation valve 20. Isolation valve 20 is a valve via which first brake circuit 16 is hydraulically connected to a main brake cylinder 22 of the brake system. First brake circuit 16 may be connected via isolation valve 20 to main brake cylinder 22 in such a way that first brake circuit 16 can be decoupled from main brake cylinder 22 by closing separation valve 20, and a first actual brake pressure present in decoupled first brake circuit 16 can be set to a value differing from an internal pressure of main brake cylinder 22.

Moreover, control device/arrangement 12 is configured so that, taking into account specification quantity 14, it outputs at least one first control signal 24 to at least one first hydraulic component 26 and 28 of the brake system. The first actual brake pressure present in first brake circuit 16 can be varied via the at least one first hydraulic component 26 and 28 controlled by the at least one first control signal 24, in particular after isolation valve 20, controlled by closing signal 18, has been controlled into its closed state. In this way, control device 10 can, via the outputting of signals 18 and 24, decouple first brake circuit 16 from main brake cylinder 22, and can relatively freely adjust the first actual brake pressure present in decoupled first brake circuit 16. Control device 10 can therefore be used for an autonomous pressure buildup in first brake circuit 16, and/or for a blending of a generator braking moment by first brake circuit 16.

Control device/arrangement 12 is moreover configured to determine an existing functional impairment of the at least one first hydraulic component 26 and 28 and/or of at least one other brake system component of the brake system, or to receive a warning signal regarding the existing functional impairment. After a determination of the existing functional impairment, or after reception of the warning signal, control device/arrangement 12 is additionally configured to output a closing signal 30 to a changeover valve 32 of a second brake circuit 34 of the brake system. Changeover valve 32 can be controlled into its closed state using closing signal 30. In addition, control device/arrangement 12 is configured, after or simultaneously with the outputting of closing signal 30 to changeover valve 32, to output an opening signal 36 to isolation valve 20 by which isolation valve 20 can be controlled into its open state.

Control device 10 can therefore advantageously react to a functional impairment of the at least one first hydraulic component 26 and 28 and/or of the at least one additional brake system component, such as a circuit failure of first brake circuit 16. By opening isolation valve 20, the first actual brake pressure present in first brake circuit 16 can be increased using the internal pressure in main brake cylinder 22. In particular, after the opening of isolation valve 20, the driver has the possibility of actively braking into first braking circuit 16 by actuating a brake actuating element 38, such as a brake pedal, connected to main brake cylinder 22. If no leakage is present (circuit failure of brake circuit 16), then it is possible, after the opening of isolation valve 20, to build up a pressure in brake circuit 16 without for this purpose pushing the piston of the main brake cylinder toward the block. In case of error (circuit failure of brake circuit 16), then, given an open isolation valve 20, it is possible to push the main brake cylinder toward the block in order to close brake circuit 16 with the piston of the main brake cylinder, in order in this way to build up pressure in second brake circuit 34.

Through the closing, executed previously or simultaneously, of changeover valve 32 by closing signal 30, it is in addition prevented that the opening of isolation valve 20 will cause a brief collapse of the second actual brake pressure present in second brake circuit 34. Because changeover valve 32 is closed before or while isolation valve 20 is open, the second actual brake pressure built up/existing in second brake circuit 34 cannot escape from this brake circuit. In this way, a temporary reduction of a braking performance of at least one wheel brake cylinder 40 of second brake circuit 34 can be prevented. Therefore, the vehicle can still be braked comparatively quickly even given circuit failure of first brake circuit 16.

Wheel brake cylinders 40 of second brake circuit 34 are hydraulically connected to main brake cylinder 22 via the at least one changeover valve 32. Changeover valve 32 of second brake circuit 34 may be understood as a valve having a check valve 42. Such a changeover valve 32 having a check valve 42 is also designated as being capable of being bypassed by the driver. Thus, even when changeover valve 32 is in its closed state, the driver still has the possibility, via a (further) actuation of brake actuating element 38, of actively braking into second brake circuit 34, and thereby increasing the second actual brake pressure present therein.

Specification quantity 14 can be capable of being provided for example by a sensor 44 for determining an actuation strength of an actuation of brake actuating element 38 by the driver. For example, a brake actuation path sensor, in particular a rod path sensor, a brake pressure sensor, and/or a brake force sensor, may be used as sensor 44. In particular, a pedal path sensor can be used to measure specification quantity 14.

In the specific embodiment shown in FIG. 1, a pump 26 and a continuously adjustable valve 28 can be controlled by the at least one first control signal 24, as the at least one hydraulic component 26 and 28 of first brake circuit 14. However, it is to be noted that control device 10 is not limited to cooperation with pump 26 and with continuously adjustable valve 28. For example, a plunger of first brake circuit 16 can also be controlled by the at least one first control signal 24.

In an advantageous development, control device/arrangement 12 is configured so that, after the outputting of closing signal 30 to changeover valve 32 and the outputting of opening signal 36 to isolation valve 20, it controls at least one second hydraulic component 46 of the brake system, such as a pump 46 of second brake circuit 34, using at least one second control signal 48, in such a way that the second actual brake pressure present in second brake circuit 34 can be increased by the at least one second hydraulic component 46 controlled by the at least one second control signal 48. Thus, despite the closed state of changeover valve 32, an additional active pressure buildup can still be executed in second brake circuit 34 by the at least one second hydraulic component 46. In particular, in this way the second actual brake pressure can be increased as a function of (pedal) actuation and/or as a function of slippage.

In the specific embodiment shown in FIG. 1, each of the two brake circuits 16 and 34 has two wheel brake cylinders 40. Moreover, each of the two brake circuits 16 and 34 has a respective wheel inlet valve 50 and a respective wheel outlet valve 52 per wheel brake cylinder 40. Moreover, first brake circuit 16 is connected, via an intake line 54, to a brake fluid reservoir 56, and both a conveyor side of pump 26 and continuously adjustable valve 28 are hydraulically connected, via intake line 54, to brake fluid reservoir 56. Only second brake circuit 34 has a high-pressure switching valve 58 to which its two wheel outlet valves 52 are hydraulically connected via a pressure relief valve 60. Between pressure relief valve 60 and the two wheel outlet valves 52, second brake circuit 34 additionally has another storage chamber 62 (low-pressure storage chamber). Pumps 26 and 46 of the different brake circuits 16 and 34 can additionally be situated on a common shaft 66 of a motor 68. However, it is to be noted that the realization of brake circuits 16 and 34 in FIG. 1 is presented only as an example. The usability of control device 10 is not limited to a particular realization of brake circuits 16 and 34.

First brake circuit 16 can for example be allocated to a front axle of a vehicle, while second brake circuit 34 can be used to brake a rear axle of the vehicle. The usability of control device 10 is however not limited to a particular assignment of brake circuits 16 and 34 to particular vehicle axles. Moreover, control device 10 can also interact with a brake system having a diagonal (or: X-shaped) brake circuit configuration.

It is to be noted that control device 10 can be used not only in an electric vehicle or hybrid vehicle; instead, control device 10 can be used for all vehicle types. The brake system that cooperates with control device 10 can optionally be equipped with a braking force booster 64, such as an electromechanical braking force booster 64 or a vacuum braking force booster. Control device 10 can however also work together with a brake system not having a braking force booster 64.

In order to determine the functional impairment of the at least one first hydraulic component 26 and 28 and/or of the at least one further brake system component, each of brake circuits 16 and 34 can have at least one pressure sensor 70. In this way, a quantity relating to the actual brake pressure present in respective brake circuit 16 and 34 can be continuously measured and compared to at least one reference quantity. In this way, the functional impairment of the at least one first hydraulic component 26 and 28, and/or of the at least one further brake system component can be quickly recognized. The monitoring of the quantity, such as for example an admission pressure, can be carried out by control device 10. As an alternative to this, the brake system can also have a monitoring device (not shown) that, after a determination of the functional impairment, provides the corresponding warning signal to control device 10.

In an advantageous specific embodiment, control device/arrangement 12 is configured so that after the outputting of closing signal 30 to changeover valve 32 and after the outputting of opening signal 36 to the separation valve, it compares an actual pressure quantity (provided e.g. by a sensor 70) regarding an admission pressure to a specified threshold value quantity, and, as soon as the actual pressure quantity lies above the threshold value quantity, outputs an opening signal 72 to changeover valve 32, by which changeover valve 32 can be controlled into its open state. In this way, a premature opening of changeover valve 32 can be reliably prevented. The actual pressure quantity can for example be provided by an admission pressure sensor.

Likewise, control device/arrangement 12 can be configured so that, after the outputting of closing signal 30 to changeover valve 32 and after the outputting of opening signal 36 to separation valve 20, it compares a newly provided specification quantity 14 to a specified comparison specification quantity, and, as soon as specification quantity 14 is equal to the comparison quantity, outputs opening signal 72 to changeover valve 32, by which changeover valve 32 can be controlled into its open state. The comparison quantity can for example correspond to a brake path, a braking force, and/or a brake pressure when there is an actuation of brake actuation element 38 (e.g. the brake pedal). In this way, it can be ensured that the opening of changeover valve 32 does not take place until the driver actuates brake actuating element 38.

As a further alternative, control device/arrangement 12 can be configured so that it outputs opening signal 72, by which changeover valve 32 can be controlled into its open state, to changeover valve 32 after an expiration of a fixedly specified time interval, beginning with or after the outputting of closing signal 30. In all specific embodiments listed here, it is reliably ensured that changeover valve 32 is not opened until after a collapse of second actual brake pressure in second brake circuit 34 can be reliably excluded.

The advantages described above are also ensured in a brake system for a vehicle having control device 10.

Figure 2A:
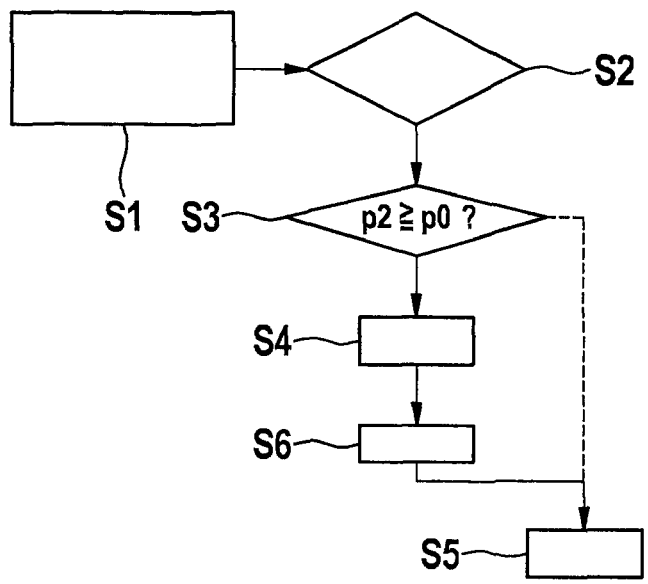
FIG. 2a shows a flow diagram explaining a first specific embodiment of the method for operating a brake system of a vehicle.
Figure 2B:
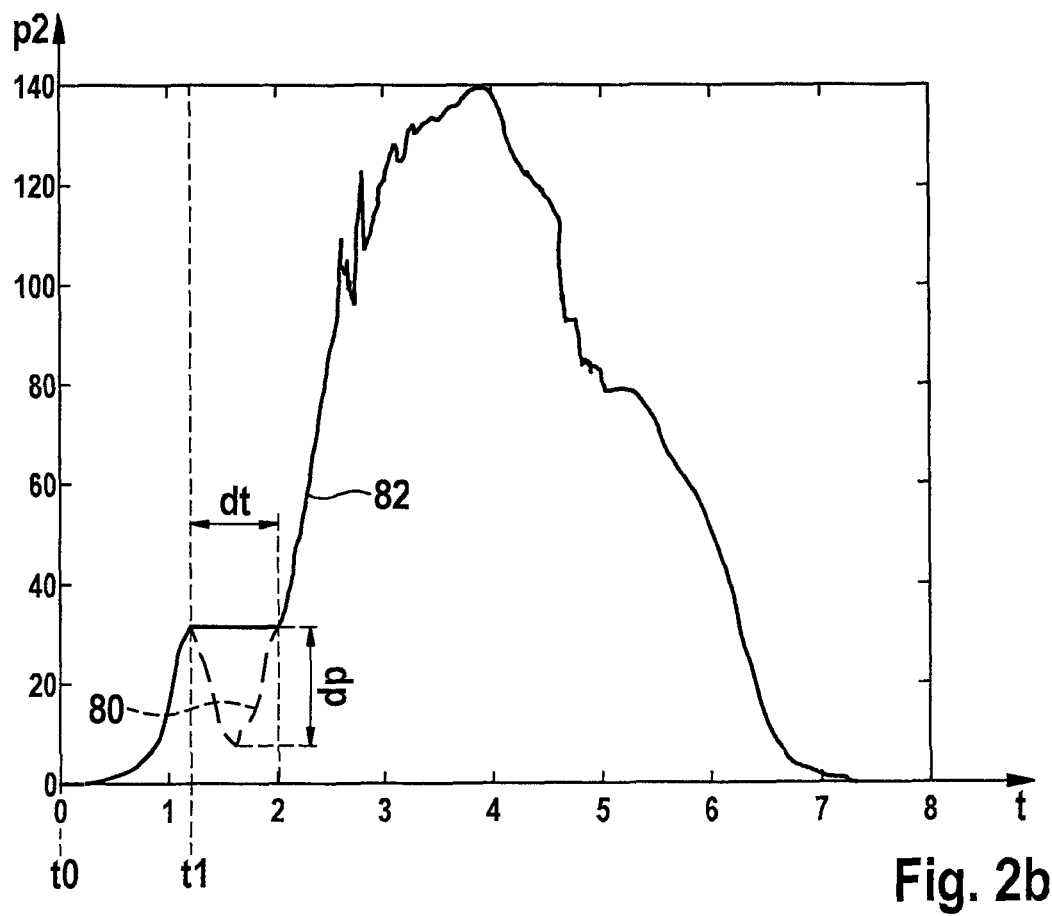
FIG. 2b shows a coordinate system explaining a first specific embodiment of the method for operating a brake system of a vehicle.

FIGS. 2a and 2b show a flow diagram and a coordinate system explaining a first specific embodiment of the method for operating a brake system of a vehicle.

The method may be carried out during an actuation of a brake actuating element by a driver. For example, in order to carry out the method the above-described control device can be used.

However, it is to be noted that the practicability of the method is not limited to a use of such a control device.

In a method step S1 of the flow diagram shown in FIG. 2a, a first actual brake pressure present in a first brake circuit of the brake system is varied. In particular, the first actual brake pressure can be increased or lowered to a value differing from an internal pressure in a main brake cylinder of the brake system. For this purpose, in method step S1 an isolation valve, via which the first brake circuit is hydraulically connected to the main brake cylinder of the brake system, is controlled into its closed state. After or during the controlling of the isolation valve into its closed state, at least one first hydraulic component of the brake system is controlled taking into account a specified target brake pressure that is to be set at least in the first brake circuit. The target brake pressure can for example be determined by a brake actuating element sensor, corresponding to an actuation strength of an actuation of a brake actuating element by a driver. A continuously adjustable valve, a pump, and/or a plunger can for example be used as the at least one first hydraulic component.

During method step S1, a method step S2 is also carried out. In method step S2, it is determined whether a functional impairment of the at least one first hydraulic component and/or of at least one further brake system component of the brake system is present. Here it is to be noted that method step S2 is carried out after the closing of the isolation valve. In an advantageous specific embodiment, in method step S2 it is checked whether a pressure buildup specified by the target brake pressure is satisfactorily carried out in the first brake circuit. For this purpose, for example an actual pressure quantity, provided by at least one pressure sensor of the first brake circuit, relating to the first actual brake pressure is evaluated. In this way, the functional impairment of the at least one first hydraulic component and/or of the at least one further brake system component of the brake system, such as for example a circuit failure of the first brake circuit, can be reliably recognized.

FIG. 2b shows a coordinate system whose abscissa is time axis t, and whose other axis is a second actual brake pressure p2 present in a second brake circuit connected to the main brake cylinder.

As can be seen on the basis of the coordinate system of FIG. 2b, the driver can directly brake into the second brake circuit already from the beginning of a brake actuation at time t0, and in this way can increase a second actual brake pressure p2 present therein. At time t1, method step S2 is used to determine a functional impairment, such as a circuit failure of the first brake circuit. Beginning from the determination of the functional impairment at time t1, a method step S3 is optionally carried out. In method step S3, second actual brake pressure p2, or a corresponding quantity, is compared to a comparison pressure value p0. If second actual brake pressure p2 present in the second brake circuit is greater than comparison pressure value p0, a method step S4 is carried out. In method step S4, a changeover valve of the second brake circuit is controlled into its closed state. Simultaneously or after the controlling of the changeover valve into its closed state, in a further method step S5 the isolation valve (of the first brake circuit) is controlled into its open state.

As soon as it has been determined in method step S3 that second actual brake pressure p2, or a corresponding quantity, is smaller than comparison pressure value p0, method step S4 can be omitted, and method step S5 can be directly carried out. However, it is expressly to be noted that the execution of method step S3 is optional. For example, the execution of method step S3 can also be omitted, so that after the determination of the functional impairment method steps S4 and S5 are automatically carried out.

Optionally, between method steps S4 and S5 a further method step S6 can be carried out in which a specified waiting time is allowed to elapse after the execution of method step S4 before beginning the opening of the isolation valve in method step S5. However, the execution of method step S6 is optional.

By closing the changeover valve at the same time as or before the opening of the isolation valve, second actual brake pressure p2 can be enclosed in the second brake circuit. In this way, a pressure loss dp in the second brake circuit that would otherwise occur and that is shown by broken line 80 in FIG. 2 is reliably prevented. Pressure loss dp would cause a delay time dt that would have to elapse before second actual brake pressure p2, present at time t1, would again be present in the second brake circuit. However, this disadvantage is removed by the execution of method step S4. With the execution of method step S4, pressure loss dp can be reliably prevented. The method described here therefore ensures the advantages named above (and graph line 82, with a jumping over of delay time dt).

In an optional method step (not shown), after the controlling of the changeover valve into its closed state (method step S4) and the controlling of the isolation valve into its open state (method step S5) at least one second hydraulic component of the brake system is controlled in such a way that a second actual brake pressure p2 present in the second brake circuit is (additionally) increased. In this way, for example a pump can be used to additionally increase second actual brake pressure p2, brought about by the direct braking of the driver into the second braking circuit. In this way, it can be ensured that at a driver braking force of approximately 500 N at the latest, the legal minimum delay for the rapid braking of the vehicle is achieved.

Figure 3:
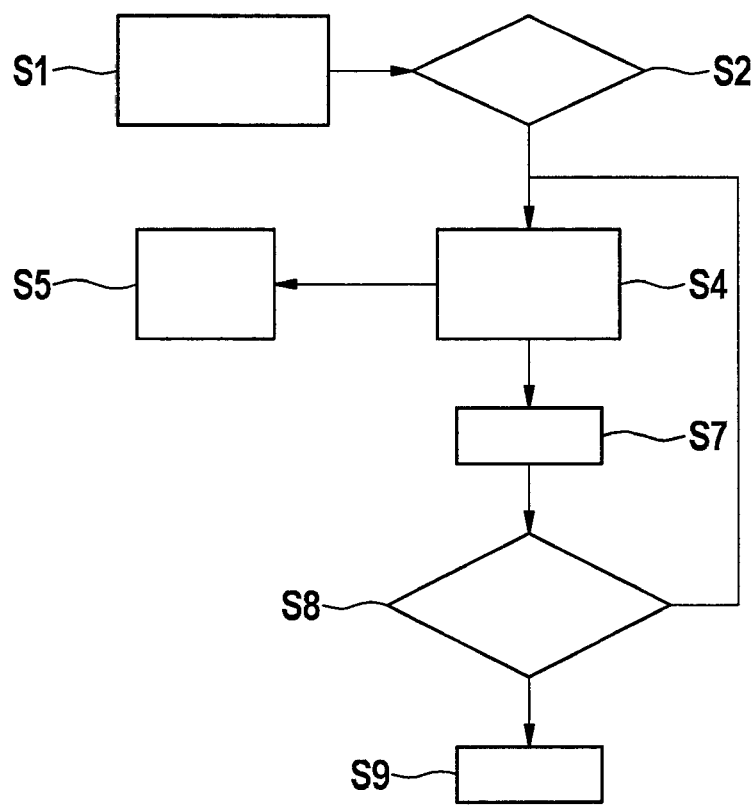
FIG. 3 shows a flow diagram representing a second specific embodiment of the method for operating a brake system of a vehicle.

FIG. 3 shows a flow diagram representing a second specific embodiment of the method for operating a brake system of a vehicle.

The method schematically shown in FIG. 3 has method steps S1, S2, S4, and S5 described above. Optionally, the method can also be expanded to include method steps S3 and S6.

Moreover, in the method shown in FIG. 3, after method step S4 has been carried out another specified time interval is allowed to elapse (method step S7). After this, in a further method step S8 a provided actual pressure quantity regarding an admission pressure is compared to a provided threshold value quantity. As soon as the actual pressure quantity is smaller than the threshold value quantity, method steps S4, S7, and S8 are again carried out. Otherwise, in a method step S9 an opening signal is outputted to the changeover valve, by which the changeover valve is controlled into its open state.

The procedure can also be described such that after the controlling of the changeover valve into its closed state (method step S4) and the controlling of the isolation valve into its open state (method step S5), the changeover valve is controlled into its open state as soon as a determined admission pressure is greater than a specified threshold value quantity. In this way, it can be ensured that the changeover valve is not opened again until the driver has compensated the pressure collapse by actuating the brake actuating element.

As an alternative to the procedure of FIG. 3, after the controlling of the changeover valve into its closed state (method step S4) and the controlling of the isolation valve into its open state (method step S5), the changeover valve can be controlled into its open state as soon as an interruption/termination of an actuation of a brake actuating element by a driver is determined. Likewise, after the controlling of the changeover valve into its closed state (method step S4) and the controlling of the isolation valve into its open state (method step S5), the changeover valve can be controlled into its open state as soon as a fixedly specified time interval, beginning with or after the controlling of the changeover valve into its closed state, has expired. In this case as well, it is reliably ensured that the opening of the changeover valve does not take place until a pressure collapse can be reliably excluded.

What is claimed is:

1. A control device for a brake system of a vehicle, comprising:
a control arrangement that is configured to:
taking into account a provided specification quantity relating to at least one target brake pressure that is to be set in a first brake circuit of the brake system, output:
a closing signal by which an isolation valve, via which the first brake circuit is hydraulically connected to a main brake cylinder of the brake system, is controllable into its closed state; and
at least one first control signal by which at least one first hydraulic component of the brake system is controllable to vary a first actual brake pressure present in the first brake circuit;
while the isolation valve is in its closed state due to the closing signal, determine, or receive a warning signal relating to, an existing functional impairment of at least one of (i) the at least one first hydraulic component, and (ii) at least one other brake system component of the brake system; and
responsive to the determination or receipt, output:
a closing signal by which a changeover valve of a second brake circuit of the brake system is controllable into its closed state, wherein the closing of the changeover valve prevents a leak of pressure out of the second brake circuit and into the first brake circuit via the main brake cylinder and the isolation valve; and
an opening signal by which the isolation valve is controllable into its open state.

2. The control device of claim 1, wherein the first and second brake circuits are hydraulically connectable to each other via a hydraulic communication path that extends in series from the second brake circuit to the changeover valve to the main brake cylinder to the isolation valve to the first brake circuit.

3. The control device of claim 1, wherein the isolation valve controls a hydraulic connection of a first one or more of a plurality of brake cylinders to the main brake cylinder, the changeover valve controls a hydraulic connection of a second one or more of the plurality of brake cylinders to the main brake cylinder and does not control the hydraulic connection of any of the first one or more of the plurality of brake cylinders to the main brake cylinder, and the isolation valve does not control the hydraulic connection of any of the second one or more of the plurality of brake cylinders to the main brake cylinder.

4. The control device of claim 1, wherein the changeover valve hydraulically connects the second brake circuit to the main brake cylinder.

5. The control device of claim 1, wherein the control device is configured to control a hydraulic connection of a first one or more of a plurality of brake cylinders to the main brake cylinder by controlling the isolation valve, the control device is configured to control a hydraulic connection of a second one or more of the plurality of brake cylinders to the main brake cylinder by controlling the changeover valve, none of the first one or more of the plurality of brake cylinders is hydraulically connectable to the main brake cylinder via the changeover valve, and none of the second one or more of the plurality of brake cylinders is hydraulically connectable to the main brake cylinder via the isolation valve.

6. A control device for a brake system of a vehicle, comprising:
a control arrangement that is configured to:
taking into account a provided specification quantity relating to at least one target brake pressure that is to be set in a first brake circuit of the brake system, output:
a closing signal by which an isolation valve, via which the first brake circuit is hydraulically connected to a main brake cylinder of the brake system, is controllable into its closed state; and
at least one first control signal by which at least one first hydraulic component of the brake system is controllable to vary a first actual brake pressure present in the first brake circuit;
determine, or receive a warning signal relating to, an existing functional impairment of at least one of (i) the at least one first hydraulic component, and (ii) at least one other brake system component of the brake system;
responsive to the determination or receipt, output:
a closing signal by which a changeover valve of a second brake circuit of the brake system is controllable into its closed state; and
an opening signal by which the isolation valve is controllable into its open state; and
output an opening signal by which the changeover valve is controllable into its open state after an elapsing of a fixedly specified time interval beginning with or after the outputting of the closing signal by which the changeover valve is controllable into its closed state.

7. The control device of claim 6, wherein the output of the opening signal occurs after or simultaneously with the output of the closing signal by which the changeover valve is controllable into its closed state.

8. A brake system for a vehicle, comprising:
a control device including a control arrangement that is configured to:
taking into account a provided specification quantity relating to at least one target brake pressure that is to be set in a first brake circuit of the brake system, output:
a closing signal by which an isolation valve, via which the first brake circuit is hydraulically connected to a main brake cylinder of the brake system, is controllable into its closed state; and
at least one first control signal by which at least one first hydraulic component of the brake system is controllable to vary a first actual brake pressure present in the first brake circuit;
while the isolation valve is in its closed state due to the closing signal, determine, or receive a warning signal relating to, an existing functional impairment of at least one of (i) the at least one first hydraulic component, and (ii) at least one other brake system component of the brake system; and
responsive to the determination or receipt:
output a closing signal by which a changeover valve of a second brake circuit of the brake system is controllable into its closed state, wherein the closing of the changeover valve prevents a leak of pressure out of the second brake circuit and into the first brake circuit via the main brake cylinder and the isolation valve; and
output an opening signal by which the isolation valve is controllable into its open state.

9. A method for operating a brake system of a vehicle, the method comprising:

taking into account a specified target brake pressure that is to be set in at least a first brake circuit of the brake system:
  controlling an isolation valve, via which the first brake circuit is hydraulically connected to a main brake cylinder of the brake system, into its closed state; and
  controlling at least one first hydraulic component of the brake system, thereby varying a first actual brake pressure present in the first brake circuit;
while the isolation valve is in its closed state due to the controlling of the isolation valve, determining whether there is present a functional impairment of at least one of (i) the at least one first hydraulic component, and (ii) at least one further brake system component of the brake system is present; and
responsive to the presence of the functional impairment being determined in the determining step:
  controlling a changeover valve of a second brake circuit of the brake system into its closed state, wherein the closing of the changeover valve prevents a leak of pressure out of the second brake circuit and into the first brake circuit via the main brake cylinder and the isolation valve; and
  controlling the isolation valve into its open state.

10. A control device for a brake system of a vehicle, comprising:
  a control arrangement that is configured to:
    taking into account a provided specification quantity relating to at least one target brake pressure that is to be set in a first brake circuit of the brake system, output:
      a closing signal by which an isolation valve, via which the first brake circuit is hydraulically connected to a main brake cylinder of the brake system, is controllable into its closed state; and
      at least one first control signal by which at least one first hydraulic component of the brake system is controllable to vary a first actual brake pressure present in the first brake circuit;
    determine, or receive a warning signal relating to, an existing functional impairment of at least one of (i) the at least one first hydraulic component, and (ii) at least one other brake system component of the brake system;
    responsive to the determination or receipt, output:
      a closing signal by which a changeover valve of a second brake circuit of the brake system is controllable into its closed state; and
      an opening signal by which the isolation valve is controllable into its open state; and
    after the output of the closing signal by which the changeover valve is controllable into its closed state and the output of the opening signal:
      control at least one second hydraulic component of the brake system, using at least one second control signal, so that the at least one second hydraulic component controlled by the at least one second control signal increases a second actual brake pressure present in the second brake circuit;
      compare a provided actual pressure quantity relating to an admission pressure to a specified threshold value quantity, and, responsive to a result of the comparison being that the actual pressure quantity is greater than the threshold value quantity, output an opening signal by which the changeover valve is controllable into its open state; or
      compare a newly provided specification quantity to a specified comparison specification quantity, and, responsive to a result of the comparison being that the specification quantity is equal to the comparison specification quantity, output the opening signal by which the changeover valve is controllable into its open state.

11. The control device of claim 10, wherein the control arrangement is configured to perform the control of the at least one second hydraulic component after the output of the closing signal by which the changeover valve is controllable into its closed state and the output of the opening signal.

12. The control device of claim 10, wherein the control arrangement is configured to perform the comparison of the actual pressure quantity after the output of the closing signal by which the changeover valve is controllable into its closed state and the output of the opening signal.

13. The control device of claim 10, wherein the control arrangement is configured to perform the comparison of the newly provided specification quantity after the output of the closing signal by which the changeover valve is controllable into its closed state and the output of the opening signal.

14. The control device of claim 10, wherein the output of the opening signal occurs after or simultaneously with the output of the closing signal by which the changeover valve is controllable into its closed state.

15. A method for operating a brake system of a vehicle, the method comprising:
  taking into account a specified target brake pressure that is to be set in at least a first brake circuit of the brake system:
    controlling an isolation valve, via which the first brake circuit is hydraulically connected to a main brake cylinder of the brake system, into its closed state; and
    controlling at least one first hydraulic component of the brake system, thereby varying a first actual brake pressure present in the first brake circuit;
  determining whether there is present a functional impairment of at least one of (i) the at least one first hydraulic component, and (ii) at least one further brake system component of the brake system;
  responsive to the presence of the functional impairment being determined in the determining step:
    controlling a changeover valve of a second brake circuit of the brake system into its closed state; and
    controlling the isolation valve into its open state; and
  after the controlling of the changeover valve into its closed state and of the isolation valve into its open state:
    controlling at least one second hydraulic component of the brake system so that a second actual brake pressure present in the second brake circuit is increased;
    responsive to a determination that an admission pressure is greater than a specified threshold value quantity, controlling the changeover valve into its open state;
    responsive to a determination of an interruption of a driver actuation of a brake actuating element, controlling the changeover valve into its open state; or
    responsive to lapse of a fixedly specified time interval beginning with or after the controlling of the changeover valve into its closed state, controlling the changeover valve into its open state.

16. The method of claim 15, wherein the controlling of the at least one second hydraulic component of the brake system is performed after the controlling of the changeover valve into its closed state and of the isolation valve into its open state.

17. The method of claim 15, wherein the controlling of the changeover valve into its open state is performed after the controlling of the changeover valve into its closed state and of the isolation valve into its open state and responsive to the determination that the admission pressure is greater than the specified threshold value quantity.

18. The method of claim 15, wherein the controlling of the changeover valve into its open state is performed after the controlling of the changeover valve into its closed state and of the isolation valve into its open state and responsive to the determination of the interruption.

19. The method of claim 15, wherein the controlling of the changeover valve into its open state is performed after the controlling of the changeover valve into its closed state and of the isolation valve into its open state responsive to the lapse of the fixedly specified time interval.

20. The method of claim 15, wherein the controlling of the isolation valve into its open state occurs after or simultaneously with the controlling of the changeover valve into its closed state.

* * * * *